July 21, 1953 E. W. PUMMILL 2,646,098
LOCK NUT ASSEMBLY
Filed June 23, 1949

INVENTOR.
EDWIN W. PUMMILL
BY
Lockwood, Goldsmith & Galt
ATTORNEYS.

Patented July 21, 1953

2,646,098

UNITED STATES PATENT OFFICE 2,646,098

LOCK NUT ASSEMBLY

Edwin W. Pummill, Indianapolis, Ind.

Application June 23, 1949, Serial No. 100,772

2 Claims. (Cl. 151—19)

This invention relates to a free running seating type lock-nut which is reuseable and capable of freely spinning on a bolt down to the work, and which is self-locking thereon both radially and axially of the threads of the bolt upon seating pressure being applied.

It is the object of the invention to provide a structure of the above character comprising a permanent assembly of a nut body and washer body, which co-act upon proper torque being applied to cause the washer body to compress axially and flex the threaded section of the nut inside the washer radially and axially of the bolt. When such threaded section picks up all the load that it can carry, it elongates a few thousandths of an inch for permitting the bulk of the load to move up into the main body of the nut. This action reduces the high stress concentration and torsional load normally found in the first three threads, permitting more wrench torque to be applied before exceeding the elasticity of the bolt by distributing the load over a greater number of threads than heretofore.

Due to the related contours of the washer and the nut extension, including their relative thickness, a leverage is exerted on the extension which flexes it inwardly for thread gripping when the washer is under axial compression, but upon relief thereof will return to normal so that the assembly will again be free running and reuseable.

The above is accomplished, and therefore a feature of the invention resides in the relative contours of the washer and barrel-like neck extension such as to provide a fulcrum point of axial forces for flexing said extension, all as more particularly set forth and described in the following specifications and illustrated in the drawings.

The full nature of the invention will be understood from the accompanying drawings and the following description and claims:

In the drawings, Fig. 1 is a central sectional view of the invention in disassembled relation and before the nut body has been threaded.

Figure 1:
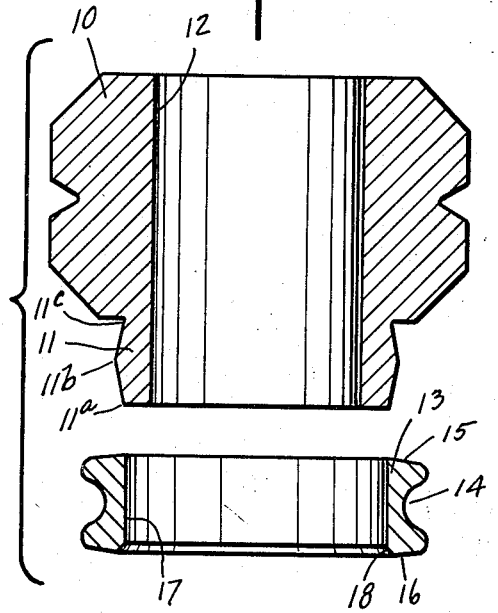

In Fig. 1, 10 indicates a nut body blank having a tool engageable periphery. Integral therewith is a tubular barrel-like neck extension 11 which is generally of reverse frusto-conical character as shown at neck portions 11a, 11b and 11c. Said body and extension is provided with a bore 12 therethrough.

The cylindrical washer body 13 has at least one peripheral channel 14 and approximately a 2 degree convex taper on each of faces 15 and 16. Said washer is provided with a chamfered portion 18 in face 16 and a bore 17 therethrough which has a diameter slightly less than the diameter of the neck portion 11a, and has a depth greater than that of the neck extension.

Figure 2:
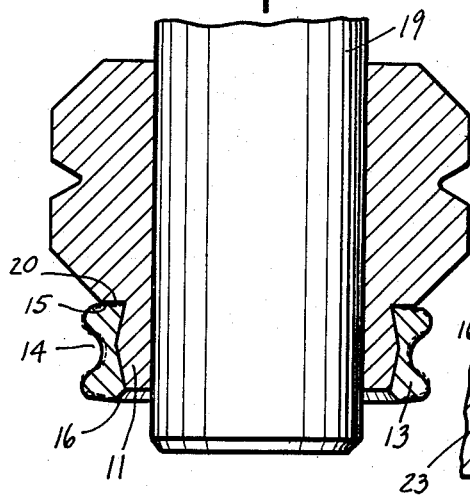
Fig. 2 is a central sectional view of the invention assembled with a pilot pin in the nut bore for assembling purposes with dotted lines showing the preassembled washer outline and before the nut body has been threaded.

The aforesaid nut and washer bodies may be assembled and fabricated in the following manner. A pilot pin 19, as shown in Fig. 2, is inserted into the bores 12 and 17 of the said bodies respectively and these parts are press fitted together axially thus creating a rigid force fit. The neck extension portion 11b is thereby aligned with and positioned opposite the peripheral channel 14 with the washer face 15 in contact with the nut body as at 20.

Figure 3:
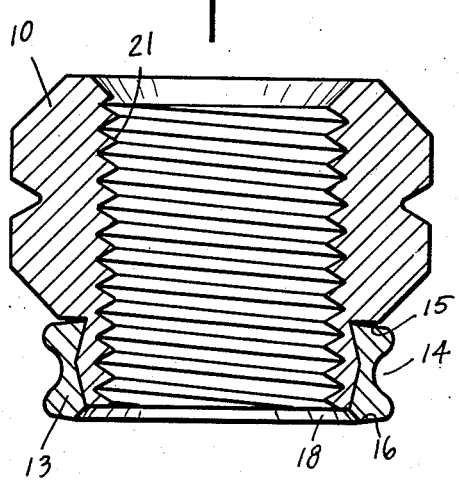
Fig. 3 is a central sectional view of the invention assembled and threaded.

The bore 12 in the assembled nut and washer is then provided with a thread 21, said thread being co-extensive with the bore 12, as shown in Fig. 3. Therefore, by threading the bore after the washer has been force fitted to the neck extension there is no thread deformation resulting from forceable assemblage after threading. Thus the present device provides a free running lock nut in that the assembled and composite nut and washer assembly may be easily threaded on the bolt and screwed down to the work by hand.

Figure 4:
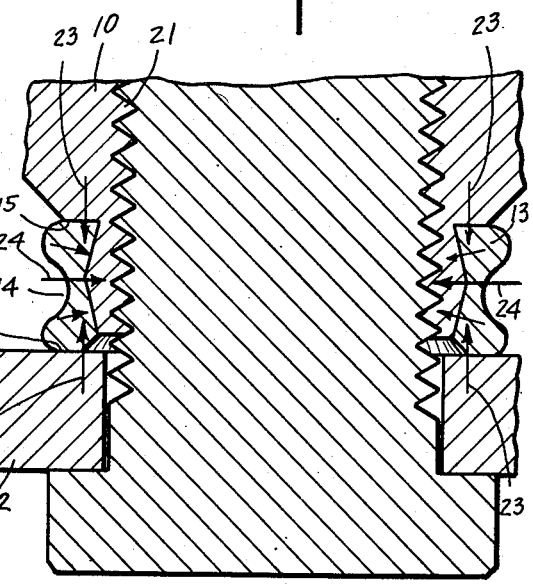
Fig. 4 is an enlarged central sectional view of the invention in working position.

The invention operates as follows: The combined nut and washer is threaded on a standard bolt and turned down to the work, as shown in Fig. 4. A torque wrench or other suitable means is then applied to the nut and as pressure is applied the washer face 16, which extends beyond the end of the neck extension 11, and which comes in contact with the work 22. Continued pressure causes said washer to axially compress and radially contact about the peripheral channel 14 thereby gripping the neck extension and forcing said neck extension threads into locking engagement with the bolt threads.

The axial compression, or accordion action about the channel 14, is due to the resisting pressure of the work against the reverse tapered washer face 16 and the pressure of the nut body against the reverse tapered washer face 15. Since the peripheral channel 14 is spaced therebetween and opposite the neck portion 11b the latter acts as a fulcrum point of force.

The fulcrum point of axial forces the neck portion or crest 11b and the accordion action of the washer are primarily responsible for the superior locking action of the invention. For as the nut is tightened the axial pressure, as shown by the arrows 23, will be diverted into lateral pressure as shown by the arrows 24 thus creating a gripping action in the area of the neck portions or crest 11b.

The lateral or gripping action forces the threads in the neck extension into tighter gripping relation to the bolt threads so that the nut locks at the extension end and the thread locking load is distributed over the length of the threaded interior of the neck extension and the nut itself. This superior thread loading eliminates the high stress concentration which is found in the first two or three threads in most type of lock nuts. When the threaded section inside the washer picks up all the load it can carry, it elongates a few thousandths of an inch permitting the bulk of the load to move up into the main body of the nut. This reduces the high stress concentration and torsional load normally found in the first three threads in the nut and bolt, permitting more wrench torque to be applied before exceeding the elasticity in the bolt. This free running lock nut, in distributing the load over additional threads, greatly reduces the possibility of bolt failure.

The nut body and washer may be made of different or like material as desired or required.

The invention claimed is:

1. A self-energizing reuseable lock-nut assembly for work engagement comprising a nut body faced for wrench engagement and a washer body, a neck extension of reduced diameter at one end of said nut body to provide an outwardly extending thrust bearing surface, said nut body and extension having an axial bore with internal threads common thereto, the external peripheral wall of said extension being of reverse frusto-conical contour to provide an intermediate annular crest with oppositely directed inwardly tapering surfaces, the said washer body having an external periphery of less outside diameter than the nut body and an axial bore of greater diameter than the bore of said nut body, said washer bore having a reverse frusto conical configuration complementary to the periphery of the wall of said extension and surrounding and closely embracing said extension in permanently interlocked relationship therewith, with one end face engaging the said bearing surface of said nut body and the other end face extending beyond the free end of said extension for end thrust bearing engagement with the work, the relative thickness of stock of said washer and extension being substantially equal and an annular channel extending about the periphery of said washer intermediate its end faces in alignment with and opposite the annular crest of said extension providing a fulcrum point of axial forces for flexing said extension from adjacent said bearing surface upon applied axial pressure and provide the nut with a locking and compression value.

2. A self-energizing reuseable lock-nut assembly for work engagement comprising a nut body faced for wrench engagement and a washer body, a neck extension of reduced diameter at one end of said nut body to provide an outwardly extending thrust bearing surface, said nut body and extension having an axial bore with internal threads common thereto, the peripheral wall of said extension being of reverse frustro-conical contour to provide an intermediate annular crest with oppositely directed inwardly tapering surfaces, the said washer body having an external periphery of less outside diameter than the nut body and an axial bore of greater diameter than the bore of said nut body, said washer bore having a reverse frusto conical configuration complementary to the periphery of the wall of said extension and surrounding and closely embracing said extension in permanently interlocked relationship therewith, one end face of said washer body having a convex taper downwardly and outwardly thereof extending into end thrust bearing engagement with the said bearing surface of said nut body, the other end face of said washer having a convex taper upwardly and outwardly thereof extending beyond the free end face of said extension for end thrust bearing engagement with the work, and an annular channel extending about the periphery of said washer intermediate its end faces in alignment with and opposite the annular crest of said extension whereby a fulcrum point of axial forces will flex said extension from adjacent said bearing surface and provide the nut with a locking and compression value.

EDWIN W. PUMMILL.

References Cited in the file of this patent

UNITED STATES PATENTS

| Number | Name | Date |
|---|---|---|
| 812,299 | Schmitt | Feb. 13, 1906 |
| 996,133 | Peters | June 27, 1911 |
| 1,406,065 | Norwood | Feb. 7, 1922 |
| 1,928,769 | Teetor | Oct. 3, 1933 |
| 1,945,005 | Vacher | Jan. 30, 1934 |
| 2,380,994 | Pummill | Aug. 7, 1945 |

FOREIGN PATENTS

| Number | Country | Date |
|---|---|---|
| 698,369 | France | Jan. 30, 1931 |